Sept. 11, 1923.

L. W. YONGE

LOCKING DEVICE FOR AUTOMOBILE STARTERS

Filed June 22, 1922

1,467,664

Inventor,
Laurie W. Yonge,
By Jas. L. Skidmore
his Attorney.

Patented Sept. 11, 1923.

1,467,664

UNITED STATES PATENT OFFICE.

LAURIE W. YONGE, OF JACKSONVILLE, FLORIDA.

LOCKING DEVICE FOR AUTOMOBILE STARTERS.

Application filed June 22, 1922. Serial No. 570,079.

*To all whom it may concern:*

Be it known that I, LAURIE W. YONGE, a citizen of the United States, residing at Jacksonville, in the county of Duval and State of Florida, have invented certain new and useful Improvements in Locking Devices for Automobile Starters, of which the following is a specification.

This invention relates to new and novel means for automatically locking what is known as the "self-starting mechanism" for automobile motors.

The main object of the invention is to provide simple, economical, durable and thoroughly efficient means for automatically locking the starter pedal device of an automobile motor during the operation of the motor, and maintaining said device in its locked condition until the motor ceases its operating movement.

A further object of this invention is to so construct my novel means that when the motor is started by depressing the pedal, a magnet secured to the outside of a casing surrounding the pedal mechanism will be energized by an electric current from the generator of an automobile thereby causing the means connected with said magnet to automatically operate a locking plate, which plate serves to prevent the pedal from again being depressed until the motor is dead, thus rendering it impossible for the driver to place the starter in gear until the motor has entirely stopped its operation.

The foregoing and such other objects as may appear from the ensuing description are attained by the construction, arrangement, assembling, combination and location of the parts hereinafter more fully described, illustrated in the accompanying drawings, and particularly pointed out in the claims appended hereto, it being understood that slight changes in the precise form, proportions and minor details of the construction may be resorted to without departing from the spirit or sacrificing any of the advantages of the invention.

In the accompanying drawings which form a part of the specification it will be seen that:—

Figure 1:
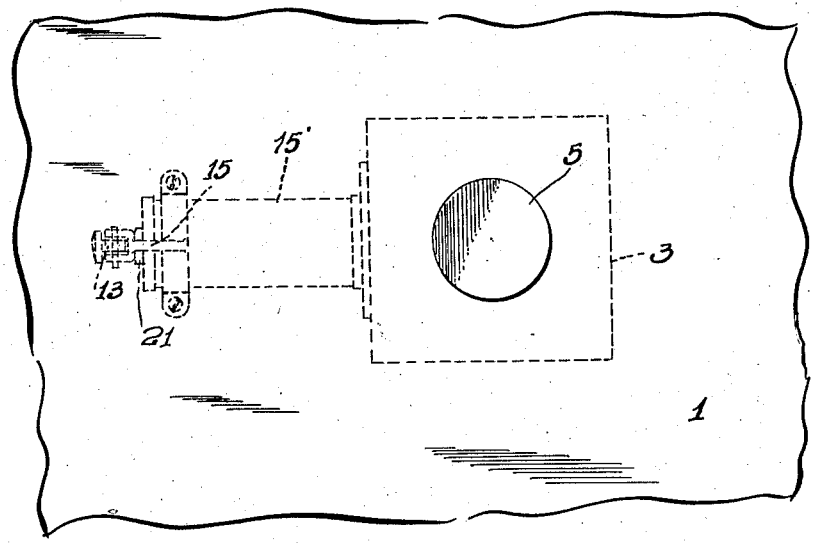
Figure 2:
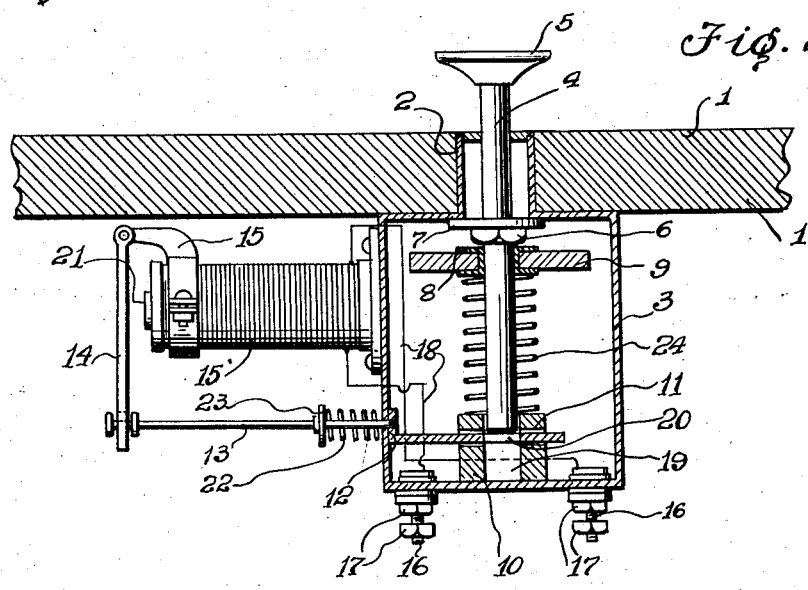

Figure 1 represents a plan view of the device embodying my invention, showing the automobile flooring broken away, and Figure 2 is a longitudinal section taken through the casing secured beneath the flooring and showing the locking plate operating mechanism in side elevation upon the outer side of said casing.

Similar numerals of reference are employed to designate like parts throughout the several figures of the drawings.

In carrying out my invention as illustrated it will be seen by reference to Fig. 2 that the flooring 1 of an automobile is provided with an opening for the reception of the upper contracted end portion 2 of a suitable metallic casing 3, the top of said end portion 2 being provided with an opening through which is passed a plunger or spindle 4, to the upper end of which is fitted a suitable button or treadle member 5. Within the said casing 3 which is fixedly secured to the underside of the flooring, is the depending treadle spindle 4 to which is suitably fitted a nut 6 carrying a disk washer 7, the latter serving as a stop to limit any undue upward movement of said spindle, and loosely supported by the spindle is a flange insulating fibre sleeve 8 adapted to carry a metal plate 9.

Fixedly secured to the inner face of the bottom portion of the casing is a metal locking member 10, provided with a slot 11 extending therethrough for the reception of a right angle locking plate 12 rigidly fitted to one end of a rod 13, the other end of said rod being suitably secured to the lower end portion of a swinging metallic bar or lever 14 pivoted at its upper end to a bracket arm 15 which is fixedly secured to an electric magnet 15', the latter being rigidly secured to the outside of the casing 3. Secured to the bottom portion of the casing are the screw-threaded binding posts 16, each of said posts being provided with an electric wire (not shown) and securing nuts 17 for connecting the electric wiring to the motor starter, which latter forms no part of this invention. Connected to said binding posts 16 are the wires 18 leading to and connected with the magnet 15'.

It will be seen that the locking member 10 is provided with a circular opening 19 for the reception of the lower end of the spindle 4 which is adapted to pass through an opening 20 formed through the locking plate 12 when said plate is caused to register in vertical alinement with the spindle 4, whereby the act of depressing the button or treadle member will cause the lower end of the spindle to contact with the bottom of the metallic casing and thereby establish an electric current between the said casing and an electric starter, whence the starting of the motor will cause an electric current to pass from the generator of the automobile to the magnet thereby energizing the magnet, thus causing the core 21 of the magnet to draw the bar or lever 14 toward the magnet, thereby forcing the rod 13 and the locking plate 12 forwardly against the tension of the coiled spring 22, which surrounds said rod 13 with one end resting against the outer side of the casing and the other end resting in contact with a spring nut 23 fitted to the said rod 13, and forces the opening 20 in the locking plate out of alinement with the spindle and the solid portion is caused to rest directly below and in the path of said spindle where the said plate will remain and thus serve to lock the spindle and treadle against another depression until the motor has entirely ceased its operation, which stoppage causes the magnet to become demagnetized and immediately permits the coiled spring 22 which has been under tension to restore the parts to the position shown in the drawings and in position for another depression of the treadle for starting purposes when desired.

It will be perceived that a portion of the spindle is surrounded by a coiled spring 24, one end of which rests in contact with the upper face of the locking member 10, while the other end of said spring rests in contact with the insulating fibre 8, said spring serving to restore the pedal and spindle to their normal position when said pedal is released or free from pressure thereon.

While I have shown and described my improved device as being connected with the flooring of an automobile it will be readily observed that the same mechanism may be connected with the dashboard and operated in substantially the same manner as herein described.

Having thus described my invention what I claim and desire to secure by Letters Patent is:—

1. A pedal locking device of the character described, comprising a casing fixedly secured to the underside of an automobile flooring, a spindle with a pedal fixedly secured to its upper end, a slotted locking member secured within said casing, a locking plate fitted within the casing having an opening therethrough, and means secured to the outerside of the casing for automatically moving said locking plate back and forth.

2. A pedal locking device of the character described, comprising a casing rigidly fitted to the lower face of an automobile flooring, an operating spindle fitted within said casing, a locking member secured to the bottom of the casing; a locking plate fitted within the casing and through a slot formed in the locking member, and means secured to the outer face of the casing and to said locking plate adapted to impart a reciprocable movement to said locking plate.

3. A pedal locking device of the character described, comprising a casing having a contracted neck portion fitted within an opening formed in an automobile flooring, a spindle fitted in an opening formed through the top of said neck portion, a locking member secured to the bottom of said casing provided with a slot therethrough, a locking plate fitted within said casing through said slot, and means connected to the outer face of said casing and to the locking plate for automatically moving said locking plate back and forth.

4. A pedal device of the character described, comprising a casing secured to the underside of an automobile flooring, a spindle fitted within the casing provided with a button at its upper end, locking means secured within said casing, an electro magnet secured to the outer face of the casing, a bracket secured to the magnet, a metallic lever pivoted to said bracket, and means connected to said lever and locking means adapted to automatically operate the said locking means by magnetism.

5. A pedal locking device of the character described, comprising a casing fitted to the lower face of an automobile flooring, a spindle fitted within said casing, a slotted locking member secured to the bottom of the casing, a locking plate fitted within said slotted member, an electro magnet fixedly secured to the outer face of the casing, and means connected to said locking plate and magnet whereby a reciprocatory movement is automatically imparted to said locking plate.

LAURIE W. YONGE.